US012067991B2

(12) United States Patent
Fuchs et al.

(10) Patent No.: US 12,067,991 B2
(45) Date of Patent: Aug. 20, 2024

(54) PACKET LOSS CONCEALMENT FOR DIRAC BASED SPATIAL AUDIO CODING

(71) Applicant: Fraunhofer-Gesellschaft zur Förderung der angewandten Forschung e.V., Munich (DE)

(72) Inventors: Guillaume Fuchs, Erlangen (DE); Markus Multrus, Erlangen (DE); Stefan Döhla, Erlangen (DE); Andrea Eichenseer, Erlangen (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 149 days.

(21) Appl. No.: 17/541,161

(22) Filed: Dec. 2, 2021

(65) Prior Publication Data

US 2022/0108705 A1 Apr. 7, 2022

Related U.S. Application Data

(63) Continuation of application No. PCT/EP2020/065631, filed on Jun. 5, 2020.

(30) Foreign Application Priority Data

Jun. 12, 2019 (EP) .................................... 19179750

(51) Int. Cl.

| | |
|---|---|
| ***G10L 19/005*** | (2013.01) |
| ***G10L 19/008*** | (2013.01) |
| ***H04R 1/32*** | (2006.01) |

(52) U.S. Cl.

CPC .......... *G10L 19/005* (2013.01); *G10L 19/008* (2013.01); *H04R 1/32* (2013.01)

(58) Field of Classification Search

CPC ........ G10L 19/005; G10L 19/008; H04R 1/32

(Continued)

(56) References Cited

U.S. PATENT DOCUMENTS

| | | | |
|---|---|---|---|
| 9,826,311 | B2 | 11/2017 | Hansson et al. |
| 9,918,175 | B2 | 3/2018 | Lee et al. |

(Continued)

FOREIGN PATENT DOCUMENTS

| | | | |
|---|---|---|---|
| CN | 104282309 A | 1/2015 | |
| EP | 2423702 A1 | 2/2012 | |

(Continued)

OTHER PUBLICATIONS

A. Politis et al, "Sector-Based Parametric Sound Field Reproduction in the Spherical Harmonic Domain," in IEEE Journal of Selected Topics in Signal Processing, vol. 9, No. 5, pp. 852-866, Aug. 2015.

(Continued)

*Primary Examiner* — Carolyn R Edwards
*Assistant Examiner* — Friedrich Fahnert
(74) *Attorney, Agent, or Firm* — Perkins Coie LLP; Michael A. Glenn

(57) ABSTRACT

What is described is a method for loss concealment of spatial audio parameters, the spatial audio parameters having at least a direction of arrival information; the method having the following steps:

receiving a first set of spatial audio parameters having at least a first direction of arrival information;

receiving a second set of spatial audio parameters, having at least a second direction of arrival information; and replacing the second direction of arrival information of a second set by a replacement direction of arrival information derived from the first direction of arrival information, if at least the second direction of arrival infor- (Continued)

mation or a portion of the second direction of arrival information is lost or damaged.

19 Claims, 10 Drawing Sheets

(58) Field of Classification Search
USPC .......................................................... 381/22
See application file for complete search history.

(56) References Cited

U.S. PATENT DOCUMENTS

| | | | |
|---|---|---|---|
| 2004/0039464 A1* | 2/2004 | Virolainen ............ | G10L 19/005 |
| 2009/0080510 A1 | 3/2009 | Wiegand et al. | |
| 2010/0159845 A1 | 6/2010 | Kaaja et al. | |
| 2010/0166191 A1* | 7/2010 | Herre .................... | G10L 19/173 381/1 |
| 2012/0114126 A1* | 5/2012 | Thiergart ............ | G10L 21/0272 381/17 |
| 2013/0187798 A1 | 7/2013 | Marpe et al. | |
| 2015/0049872 A1* | 2/2015 | Virette .................. | G10L 19/008 381/23 |
| 2015/0199973 A1 | 7/2015 | Borsum et al. | |
| 2015/0317984 A1 | 11/2015 | Chang et al. | |
| 2015/0356978 A1 | 12/2015 | Dickins et al. | |
| 2016/0148618 A1* | 5/2016 | Huang ................ | G10L 19/0212 381/2 |
| 2019/0237086 A1* | 8/2019 | Huang .................... | H04S 3/008 |
| 2019/0311723 A1* | 10/2019 | Ullmann ................. | H04L 65/80 |
| 2021/0051430 A1* | 2/2021 | Eronen ................. | G10L 19/008 |

FOREIGN PATENT DOCUMENTS

| | | | |
|---|---|---|---|
| JP | 2015532062 | A | 11/2015 |
| JP | 2016528535 | A | 9/2016 |
| RU | 2461052 | C2 | 9/2012 |
| TW | I648994 | B | 1/2019 |
| TW | I659413 | B | 5/2019 |
| WO | 2015003027 | A1 | 1/2015 |
| WO | 2018060550 | A1 | 4/2018 |

OTHER PUBLICATIONS

J. Ahonen et al, "Diffuseness estimation using temporal variation of intensity vectors", in Workshop on Applications of Signal Processing to Audio and Acoustics WASPAA, New Paltz, NY, Oct. 2009. pp. 285-288.
T. Hirvonen et al, "Perceptual compression methods for metadata in Directional Audio Coding applied to audiovisual teleconference", AES 126th Convention 2009, May 7-10, Munich, Germany. pp. 1-8.
V. Pulkki et al, "Directional audio coding—perception-based reproduction of spatial sound", International Workshop on the Principles and Application on Spatial Hearing, Nov. 2009, Zao; Miyagi, Japan, XP055083986. (4 pages).
V. Pulkki, "Virtual Sound Source Positioning Using Vector Base Amplitude Panning", J. Audio Eng. Soc., 45(6):456-466, Jun. 1997, XP002719359.

* cited by examiner

PACKET LOSS CONCEALMENT FOR DIRAC BASED SPATIAL AUDIO CODING

CROSS-REFERENCE TO RELATED APPLICATIONS

This application is a continuation of copending International Application No. PCT/EP2020/065631, filed Jun. 5, 2020, which is incorporated herein by reference in its entirety, and additionally claims priority from European Application No. 19179750.5, filed Jun. 12, 2019, which is also incorporated herein by reference in its entirety.

BACKGROUND OF THE INVENTION

Technical Field

Embodiments of the present invention refer to a method for loss concealment of spatial audio parameters, a method for decoding a DirAC encoded audio scene and to the corresponding computer programs. Further embodiments refer to a loss concealment apparatus for loss concealment of spatial audio parameters and to a decoder comprising a packet loss concealment apparatus. Embodiments describe a concept/method for compensating quality degradations due to lost and corrupted frames or packets happening during the transmission of an audio scene for which the spatial image was parametrically coded by the directional audio coding (DirAC) paradigm.

Introduction

Speech and audio communication may be subject to different quality problems due to packet loss during the transmission. Indeed bad conditions in the network, such as bit errors and jitters, my lead to the loss of some packets. These losses result in severe artifacts, like clicks, plops or undesired silences that greatly degrade the perceived quality of the reconstructed speech or audio signal at the receiver side. To combat the adverse impact of packet loss, packet loss concealment (PLC) algorithms have been proposed in conventional speech and audio coding schemes. Such algorithms normally operate at the receiver side by generating a synthetic audio signal to conceal missing data in the received bitstream.

DirAC is a perceptual-motivated spatial audio processing technique that represents compactly and efficiently the sound field by a set of spatial parameters and a down-mix signal. The down-mix signal can be a monophonic, stereophonic, or a multi-channel signals in an audio format such as A-format or B-format, also known as first order Ambisonics (FAO). The down-mix signal is complemented by spatial DirAC parameters which describe the audio scene in terms of direction-of-arrival (DOA) and diffuseness per time/frequency unit. In storage, streaming or communication applications, the down-mix signal is coded by a conventional core-coder (e.g. EVS or a stereo/multi-channel extension of EVS or any other mono/stereo/multi-channel codec), aiming to preserve the audio waveform of each channel. The core core-coder can be built around a transform-based coding scheme or speech coding scheme operating in the time domain, such as CELP. The core-coder can then integrate already existing error resilience tools such as packet loss concealment (PLC) algorithms.

On the other hand, there is no existing solution to protect the DirAC spatial parameters. Therefore there is a need for an improved approach.

It is an objective of the present invention to provide a concept for loss concealment in the context of DirAC.

SUMMARY

According to an embodiment, a method for loss concealment of spatial audio parameters, the spatial audio parameters having at least a direction of arrival information, may have the steps of: receiving a first set of spatial audio parameters having at least a first direction of arrival information; receiving a second set of spatial audio parameters, having at least a second direction of arrival information; and replacing the second direction of arrival information of a second set by a replacement direction of arrival information derived from the first direction of arrival information, if at least the second direction of arrival information or a portion of the second direction of arrival information is lost or damaged.

According to another embodiment, a method for decoding a DirAC encoded audio scene may have the steps of: decoding the DirAC encoded audio scene having a downmix, a first set of spatial audio parameters and a second set of spatial audio parameters; performing the inventive method for loss concealment as mentioned above.

Another embodiment may have a non-transitory digital storage medium having stored thereon a computer program for performing a method for loss concealment of spatial audio parameters, the spatial audio parameters having at least a direction of arrival information, the method having the steps of: receiving a first set of spatial audio parameters having at least a first direction of arrival information; receiving a second set of spatial audio parameters, having at least a second direction of arrival information; and replacing the second direction of arrival information of a second set by a replacement direction of arrival information derived from the first direction of arrival information, if at least the second direction of arrival information or a portion of the second direction of arrival information is lost or damaged, when said computer program is run by a computer.

Still another embodiment may have a non-transitory digital storage medium having stored thereon a computer program for performing a method for decoding a DirAC encoded audio scene having the steps of: decoding the DirAC encoded audio scene having a downmix, a first set of spatial audio parameters and a second set of spatial audio parameters; performing the inventive method for loss concealment as mentioned above, when said computer program is run by a computer.

According to another embodiment, a loss concealment apparatus for loss concealment of spatial audio parameters, the spatial audio parameters having at least a direction of arrival information, may have: a receiver for receiving a first set of spatial audio parameters having a first direction of arrival information and for receiving a second set of spatial audio parameters having a second direction of arrival information; a processor for replacing the second direction of arrival information of the second set by a replacement direction of arrival information derived from the first direction of arrival information if at least the second direction of arrival information or a portion of the second direction of arrival information is lost or damaged.

Another embodiment may have a decoder for a DirAC encoded audio scene having the inventive loss concealment apparatus as mentioned above.

Embodiments of the present invention provide a method for loss concealment of spatial audio parameters, the spatial audio parameters comprise at least a direction of arrival information. The method comprises the following steps:

receiving a first set of spatial audio parameters comprising a first direction of arrival information and a first diffuseness information;

receiving a second set of spatial audio parameters, comprising a second direction of arrival information and a second diffuseness information; and replacing the second direction of arrival information of a second set by a replacement direction of arrival information derived from the first direction of arrival information if at least the second direction of arrival information or a portion of the second direction of arrival information is lost.

Embodiments of the present invention are based on the finding that in case of a loss or damage of an arrival information, the lost/damaged arrival information can be replaced by an arrival information derived from another available arrival information. For example, if the second arrival information is lost, it can be replaced by a first arrival information. Expressed in other words, this means that an embodiment provides a packet loss concealment toll for spatial parametric audio for which the directional information is in case of transmission loss recovered by using previously well-received directional information and dithering. Thus, embodiments enable to combat the packet losses in transmission of spatial audio sound coded with direct parameters.

Further embodiments provide a method, where the first and the second sets of spatial audio parameters comprise a first and a second diffuse information, respectively. In such case, the strategy can be as follows: according to embodiments, the first or the second diffuseness information is derived from at least one energy ratio related to at least one direction of arrival information. According to embodiments, the method further comprises replacing the second diffuseness information of a second set by a replacement diffuseness information derived from the first diffuseness information. This is a part of a so-called hold strategy based on the assumption that the diffusions do not change much between frames. For this reason, a simple, but effective approach is to keep the parameters of the last well-received frame for frames lost during transmission. Another part of this whole strategy is to replace the second arrival information by the first arrival information, whereas it has been discussed in the context of the basic embodiment. It is generally safe to consider that the spatial image must be relatively stable over time, which can be translated for the DirAC parameters, i.e. the arrival direction which presumably also does not change much between frames.

According to further embodiments, the replacement direction of arrival information complies with the first direction of arrival information. In such case, a strategy called dithering of a direction can be used. Here the step of replacing may, according to embodiments, comprise the step of dithering the replacement direction of arrival information. Alternatively or additionally, the steps of replacing may comprise injection when the noise is the first direction of arrival information to obtain the replacement direction of arrival information. Dithering can then help make more natural and more pleasant the rendered sound field by injecting random noise to the previous direction before using it for the same frame. According to embodiments, the step of injecting may be performed if the first or second diffuseness information indicates a high diffuseness. Alternatively, it may be performed if the first or second diffuseness information is above a predetermined threshold for the diffuseness information indicating a high diffuseness. According to further embodiments, the diffuseness information comprises more space on a ratio between directional and non-directional components of an audio scene described by the first and/or second set of spatial audio parameters. According to embodiments, the random noise to be injected is dependent on the first and the second diffuseness information. Alternatively, the random noise to be injected is scaled by a factor dependent on a first and/or a second diffuseness information. Therefore, according to embodiments, the method may further comprise the step of analyzing the tonality of an audio scene described by the first and/or second set of spatial audio parameters of analyzing the tonality of a transmitted downmix belonging to the first and/or second spatial audio parameter to obtain a tonality value describing the tonality. The random noise to be injected is then dependent on the tonality value. According to embodiments, the scaling down is performed by a factor decreasing together with inverse of a tonality value or if the tonality increases.

According to a further strategy, a method comprising the step of extrapolating the first direction of arrival information to obtain the replacement direction of arrival information can be used. According to this approach, it can be envisioned to estimate the directory of the sound events in the audio scene to extrapolate the estimated directory. This is especially relevant if the sound event is well-localized in the space and as a point source (direct model having a low diffuseness). According to embodiments, an extrapolating is based on one or more additional directions of arrival information belonging to one or more sets of spatial audio parameters. According to embodiments, an extrapolation is performed if the first and/or second diffuseness information indicates a low diffuseness or if the first and/or second diffuseness information is below a predetermined threshold for diffuseness information.

According to embodiments, the first set of spatial audio parameters belong to a first point in time and/or to a first frame, both of the second set of a spatial audio parameters belong to a second point in time or to a second frame. Alternatively, the second point in time is subsequent to the first point in time or the second frame is subsequent to the first frame.

When coming back to the embodiment where most sets of spatial audio parameters are used for the extrapolation, it is clear that advantageously more sets of spatial audio parameters belonging to a plurality of points in time/frames, e.g. subsequent to each other, are used.

According to a further embodiment, the first set of spatial audio parameters comprise the first subset of spatial audio parameters for a first frequency band and a second subset of spatial audio parameters for a second frequency band. The second set of spatial audio parameters comprises another first subset of spatial audio parameters for the first frequency band and another second subset of spatial audio parameters for the second frequency band.

Another embodiment provides a method for decoding a DirAC encoded audio scene comprising the steps of decoding the DirAC encoded audio scene comprising a downmix, a first set of spatial audio parameters and a second set of spatial audio parameters. This method further comprises the steps of the method for a loss of concealment as discussed above.

According to embodiments, the above-discussed methods may be computer-implemented. Therefore an embodiment referred to a computer readable storage medium having stored thereon a computer program having a program code for performing, when running on a computer having a method according to one of the previous claims.

Another embodiment refers to a loss concealment apparatus for a loss concealment of spatial audio parameters (same comprise at least a direction of arrival information). The apparatus comprises a receiver and a processor. The receiver is configured to receive the first set of spatial audio parameters and the second set of spatial audio parameters (cf. above). The processor is configured to replace the second direction of arrival information of the second set by a replacement direction of arrival information derived from the first direction of arrival information in case of lost or damaged second direction of arrival information. Another embodiment refers to a decoder for a DirAC encoded audio sceme comprising the loss concealment apparatus.

BRIEF DESCRIPTION OF THE DRAWINGS

Embodiments of the present invention will subsequently be discussed referring to the enclosed figures, in which.

DETAILED DESCRIPTION OF THE INVENTION

Figure 1A:
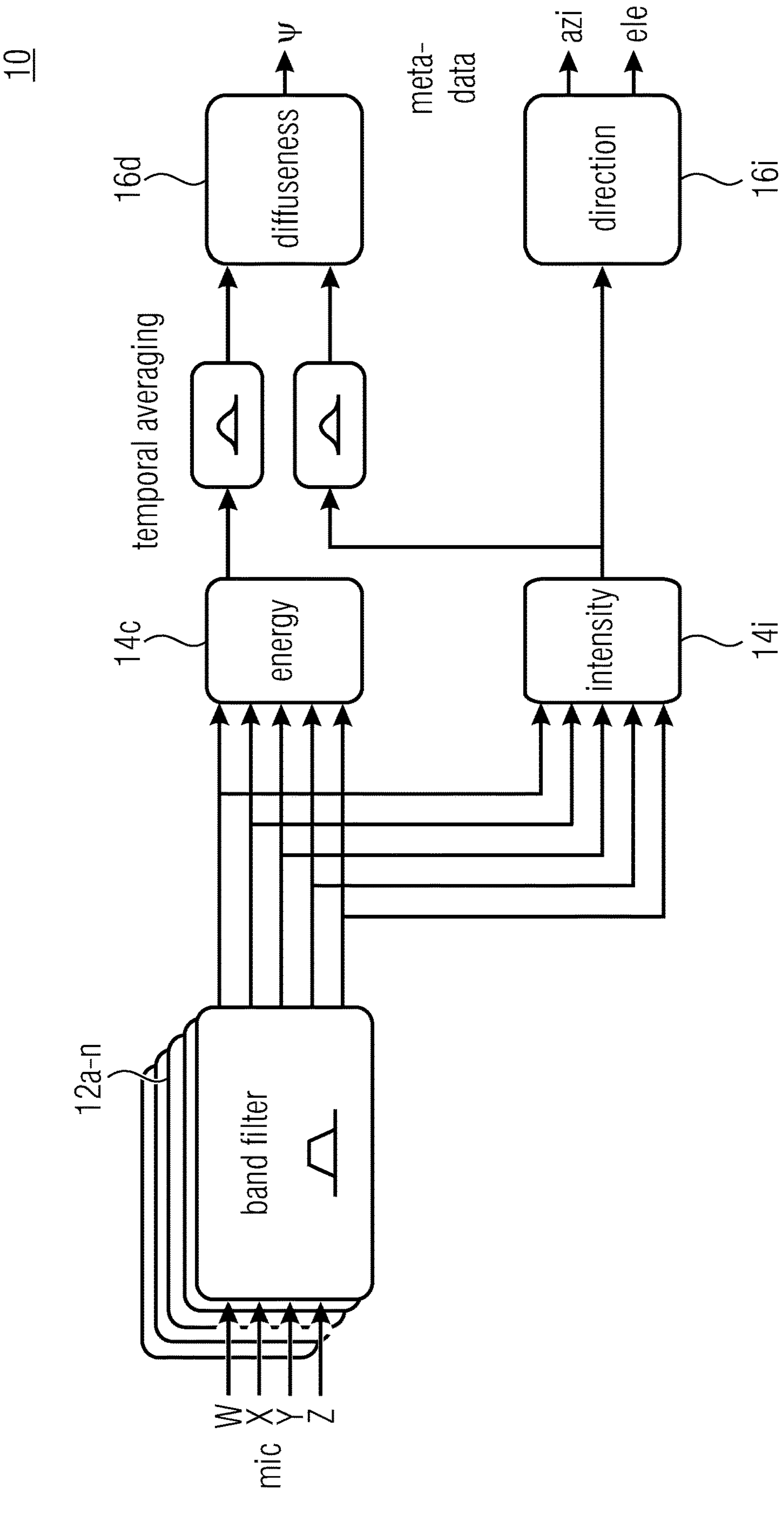
FIGS. 1*a*, 1*b* show schematic block diagrams illustrating a DirAC analysis and synthesis.

Below, embodiments of the present invention will subsequently be discussed referring to the enclosed figures, wherein identical reference numerals are provided to objects/elements having an identical or similar function, so that the description thereof is mutually applicable and interchangeable. Before discussing embodiments of the present invention in detail an introduction to DirAC is given.

Figure 1B:
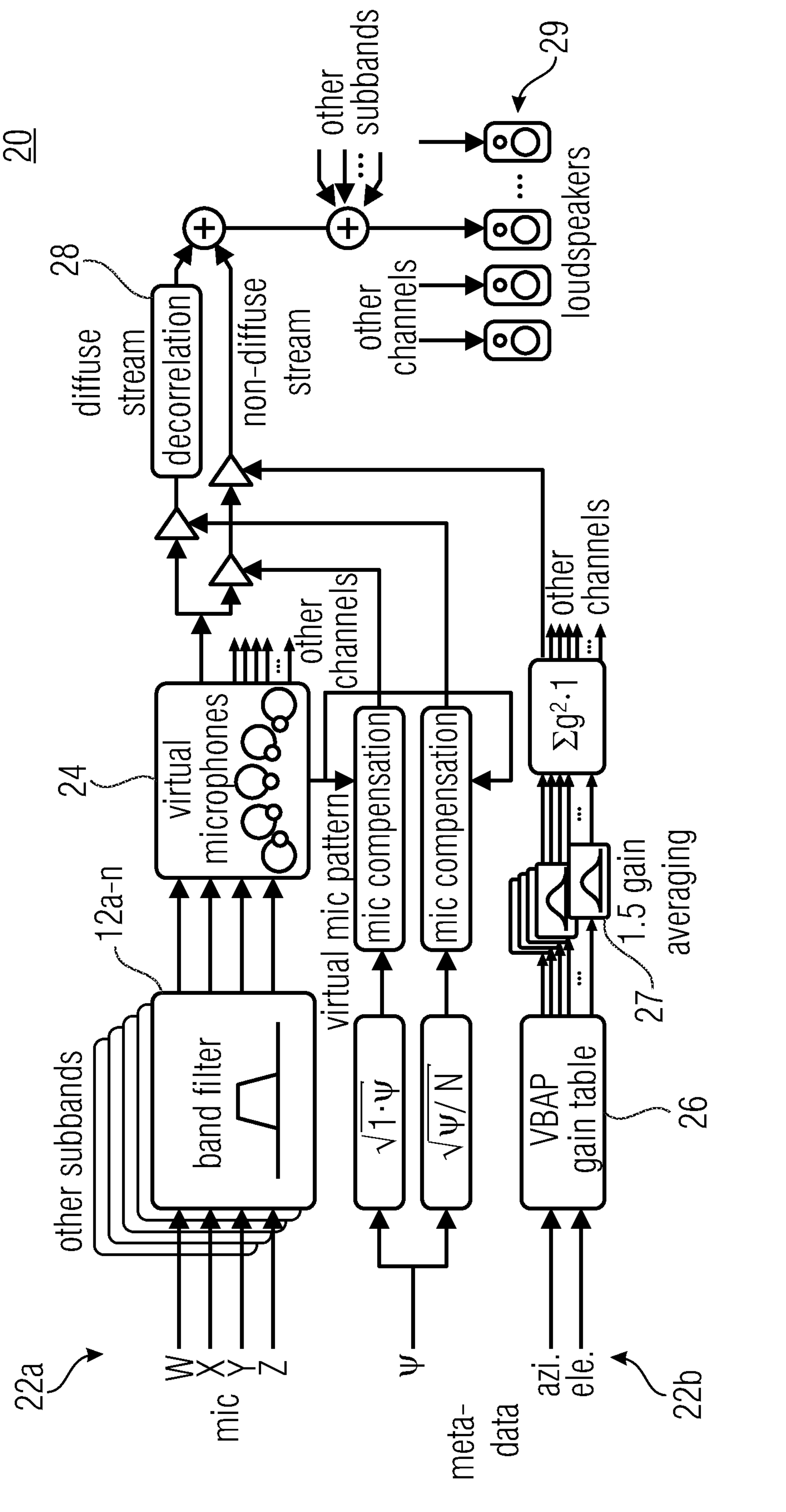

Introduction to DirAC: DirAC is a perceptually motivated spatial sound reproduction. It is assumed that at one time instant and for one critical band, the spatial resolution of auditory system is limited to decoding one cue for direction and another for inter-aural coherence. Based on these assumptions, DirAC represents the spatial sound in one frequency band by cross-fading two streams: a non-directional diffuse stream and a directional non-diffuse stream. The DirAC processing is performed in two phases:

The first phase is the analysis as illustrated by FIG. 1*a* and the second phase is the synthesis as illustrated by FIG. 1*b*.

FIG. 1*a* shows the analysis stage 10 comprising one or more bandpass filters 12*a-n* receiving the microphone signals W, X, Y and Z, an analysis stage 14*e* for the energy and 14*i* for the intensity. By use of temporally arranging the diffuseness Ψ (cf. reference numeral 16*d*) can be determined. The diffuseness Ψ is determined based on the energy 14*c* and the intensity 14*i* analysis. Based on the intensity and analysis 14*i* a direction 16*e* can be determined. The result of the direction determination is the azimuth and the elevation angle. Ψ, azi and ele are output as metadata. These metadata are used by the synthesis entity 20 shown by FIG. 1*b*.

The synthesis entity 20 as shown by FIG. 1*b* comprises a first stream 22*a* and a second stream 22*b*. The first stream comprises a plurality of bandpass filters 12*a-n* and a calculation entity for virtual microphones 24. The second stream 22*b* comprises means for processing the metadata, namely 26 for the diffuseness parameter and 27 for the direction parameter. Furthermore, a decorrelator 28 is used in the synthesis stage 20, wherein this decorrelation entity 28 receives the data of the two streams 22*a*, 22*b*. The output of the decorrelator 28 can be fed to loudspeakers 29.

In the DirAC analysis stage, a first-order coincident microphone in B-format is considered as input and the diffuseness and direction of arrival of the sound is analyzed in frequency domain.

In the DirAC synthesis stage, sound is divided into two streams, the non-diffuse stream and the diffuse stream. The non-diffuse stream is reproduced as point sources using amplitude panning, which can be done by using vector base amplitude panning (VBAP) [2]. The diffuse stream is responsible for the sensation of envelopment and is produced by conveying to the loudspeakers mutually decorrelated signals.

The DirAC parameters, also called spatial metadata or DirAC metadata in the following, consist of tuples of diffuseness and direction. Direction can be represented in spherical coordinate by two angles, the azimuth and the elevation, while the diffuseness is scalar factor between 0 and 1.

Figure 2:
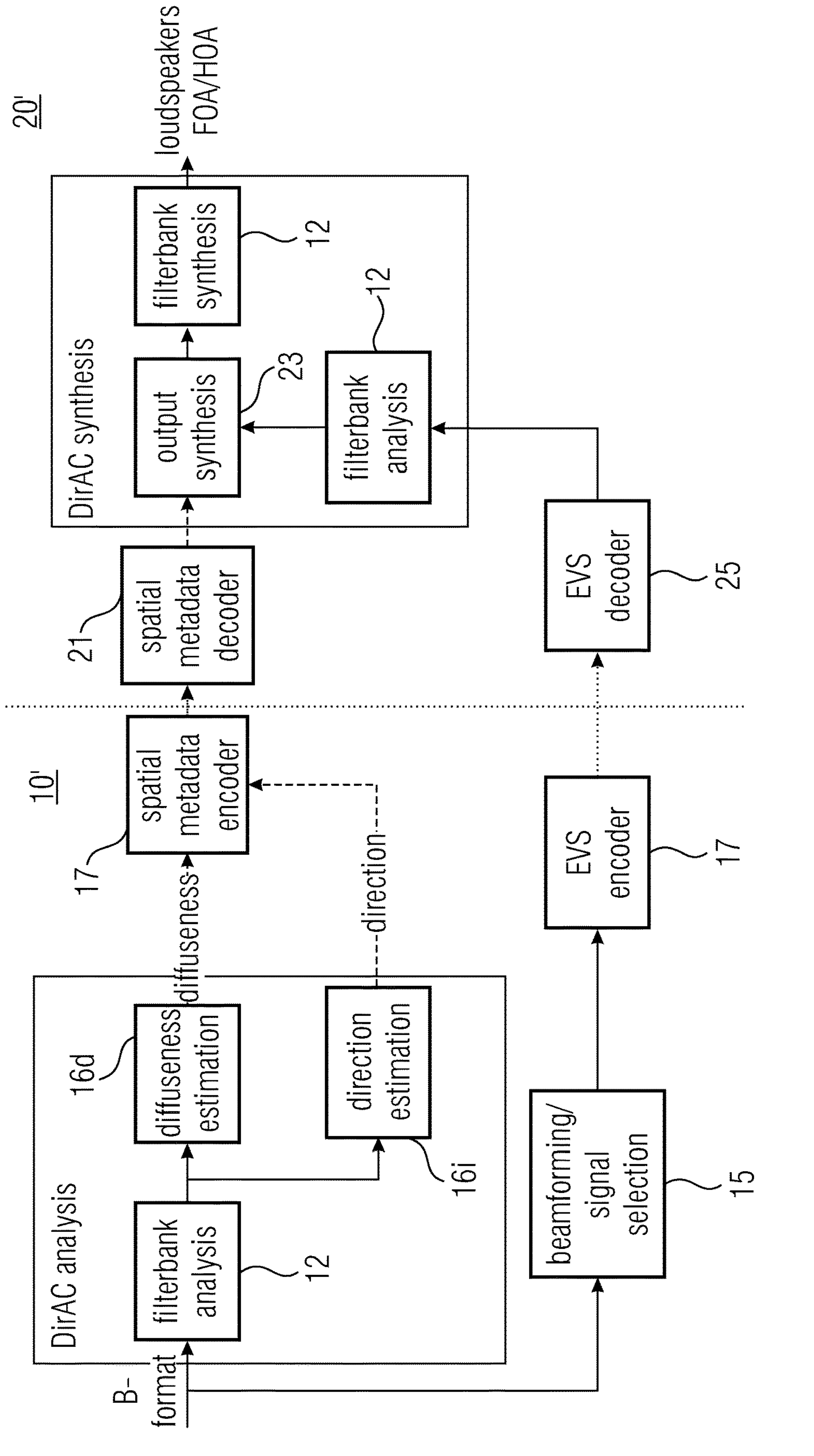
FIG. 2 shows a schematic detailed block diagram of a DirAC analysis and synthesis in the lower bitrate 3D audio coder.

Below, a system of a DirAC spatial audio coding will be discussed with respect to FIG. 2. FIG. 2 shows a two-stages DirAC analysis 10' and a DirAC synthesis 20'. Here the DirAC analysis comprises the filterbank analysis 12, the direction estimator 16*i* and the diffuseness estimator 16*d*. Both, 16*i* and 16*d* output the diffuseness/direction data as spatial metadata.

This data can be encoded using the encoder 17. The direct analysis 20' comprises spatial metadata decoder 21, an output synthesis 23, a filterbank synthesis 12 enabling to output a signal to loudspeakers FOA/HOA.

In parallel to the discussed direct analysis stage 10' and direct synthesis stage 20', which are processing the spatial metadata an EVS encoder/decoder is used. On the analysis side, a beam-forming/signal selection is performed based on the input signal B format (cf. beamforming/signal selection entity 15). The signal is then EVS encoded (cf. reference numeral 17). The signal is then EVS encoded. On the synthesis-side (cf. reference numeral 20'), an EVS decoder 25 is used. This EVS decoder outputs a signal to a filterbank analysis 12, which outputs its signal to the output synthesis 23.

Since now the structure of the direct analysis/direct synthesis 10'/' have been discussed, the functionality will be discussed in detail.

The encoder analyses 10' usually the spatial audio scene in B-format. Alternatively, DirAC analysis can be adjusted to analyze different audio formats like audio objects or multichannel signals or the combination of any spatial audio formats. The DirAC analysis extracts a parametric representation from the input audio scene. A direction of arrival (DOA) and a diffuseness measured per time-frequency unit form the parameters. The DirAC analysis is followed by a spatial metadata encoder, which quantizes and encodes the DirAC parameters to obtain a low bit-rate parametric representation.

Along with the parameters, a down-mix signal derived from the different sources or audio input signals is coded for transmission by a conventional audio core-coder. In the embodiment, an EVS audio coder is of advantagae for coding the down-mix signal, but the invention is not limited to this core-coder and can be applied to any audio core-coder. The down-mix signal consists of different channels, called transport channels: the signal can be, e.g., the four coefficient signals composing a B-format signal, a stereo pair or a monophonic down-mix depending of the targeted bit-rate. The coded spatial parameters and the coded audio bitstream are multiplexed before being transmitted over the communication channel.

In the decoder, the transport channels are decoded by the core-decoder, while the DirAC metadata is first decoded before being conveyed with the decoded transport channels to the DirAC synthesis. The DirAC synthesis uses the decoded metadata for controlling the reproduction of the direct sound stream and its mixture with the diffuse sound stream. The reproduced sound field can be reproduced on an arbitrary loudspeaker layout or can be generated in Ambisonics format (HOA/FOA) with an arbitrary order.

DirAC parameter estimation: In each frequency band, the direction of arrival of sound together with the diffuseness of the sound are estimated. From the time-frequency analysis of the input B-format components $w^i(n), x^i(n), y^i(n), z^i(n)$, pressure and velocity vectors can be determined as:

$$P^i(n,k)=W^i(n,k)$$

$$U^i(n,k)=X^i(n,k)e_x+Y^i(n,k)e_y+Z_i(n,k)e_z$$

where i is the index of the input and, k and n time and frequency indices of the time-frequency tile, and $e_x$, $e_y$, $e_z$ represent the Cartesian unit vectors. P(n,k) and U(n,k) are used to compute the DirAC parameters, namely DOA and diffuseness through the computation of the intensity vector:

$$I(k,n)=\frac{1}{2}\Re\left\{P(k,n)\cdot\overline{U(n,k)}\right\},$$

where $\overline{(.)}$ denotes complex conjugation. The diffuseness of the combined sound field is given by:

$$\psi(k,n)=1-\frac{\|E\{I(k,n)\}\|}{cE\{E(k,n)\}}$$

where E{.} denotes the temporal averaging operator, c the speed of sound and E(k,n) the sound field energy given by:

$$E(n,k)=\frac{\rho_0}{4}\|U(n,k)\|^2+\frac{1}{\rho_0c^2}\left|P(n,k)\right|^2$$

The diffuseness of the sound field is defined as the ratio between sound intensity and energy density having values between 0 and 1.

The direction of arrival (DOA) is expressed by means of the unit vector direction(n,k), defined as $$\text{direction}(n,k)=-\frac{I(n,k)}{\|I(n,k)\|}$$

The direction of arrival is determined by an energetic analysis of the B-format input and can be defined as opposite direction of the intensity vector. The direction is defined in Cartesian coordinates but can be easily transformed in spherical coordinates defined by a unity radius, the azimuth angle and elevation angle.

In the case of transmission, the parameters needed to transmitted to the receiver side via a bitstream. For a robust transmission over a network with limited capacity, a low bit-rate bitstream is of advantage which can be achieved by designing an efficient coding scheme for the DirAC parameters. It can employ for example techniques such as frequency band grouping by averaging the parameters over different frequency bands and/or time units, prediction, quantization and entropy coding. At the decoder, the transmitted parameters can be decoded for each time/frequency unit (k,n) in case no error occurred in the network. However, if the network conditions are not good enough to ensure proper packet transmission, a packet may be lost during transmission. The present invention aims to provide a solution in the latter case.

Originally, the DirAC was intended for processing B-format recording signals, also known as first-order Ambisonics signals. However, the analysis can easily be extended to any microphone arrays combining omnidirectional or directional microphones. In this case, the present invention is still relevant since the essence of the DirAC parameters is unchanged.

In addition, DirAC parameters, also known as metadata, can be calculated directly during microphone signal processing before being conveyed to the spatial audio coder. The spatial coding system based on DirAC is then directly fed by spatial audio parameters equivalent or similar to DirAC parameters in the form of metadata and an audio waveform of a down-mixed signal. DoA and diffuseness can be easily derived per parameter band from the input metadata. Such an input format is sometimes called MASA (Metadata-assisted spatial audio) format. MASA allows the system to ignore the specificity of microphone arrays and their form factors needed for computing the spatial parameters. These will be derived outside the spatial audio coding system using a processing specific to the device that incorporates the microphones.

The embodiments of the present invention may use a spatial coding system as illustrated by FIG. 2, where a DirAC based spatial audio encoder and decoder are depicted. Embodiments will be discussed with respect to FIGS. 3*a* and 3*b*, wherein extensions to the DirAC model will be discussed before.

The DirAC model can according to embodiments also be extended by allowing different directional components with the same Time/Frequency tile. It can be extended in two main ways:

The first extension consists of sending two or more DoAs per T/F tile. Each DoA must be then associated with an energy, or an energy ratio. For example, the lth DoA can be associated with an energy ratio $\Gamma_l$ between the energy of the directional component and the overall audio scene energy:

$$\Gamma_l(k,n)=\frac{\|E\{I_l(k,n)\}\|}{cE\{E(k,n)\}}$$

where $I_l(k,n)$ is the intensity vector associated to the lth direction. If L DoAs are transmitted along with their L energy ratios, the diffuseness can then be deduced from the L energy ratios as:

$$\Psi(k,n) = 1 - \sum_{l=1}^{L} \Gamma_l\ (k,n)$$

The spatial parameters transmitted in the bitstream can be the L directions along with the L energy ratios or these latest parameters can also be converted to L−1 energy ratios + a diffuseness parameter.

$$\Psi = 1 - \sum_{l=1}^{L} \Gamma_l$$

The second extension consists of splitting the 2D or 3D space into non-overlapping sectors and transmitting for each sectors a set of DirAC parameters (DoA+sector-wise diffuseness). We then speak about High-order DirAC as introduced in [5].

Both extensions can actually be combined, and the present invention is relevant for both extensions.

Figure 3A:
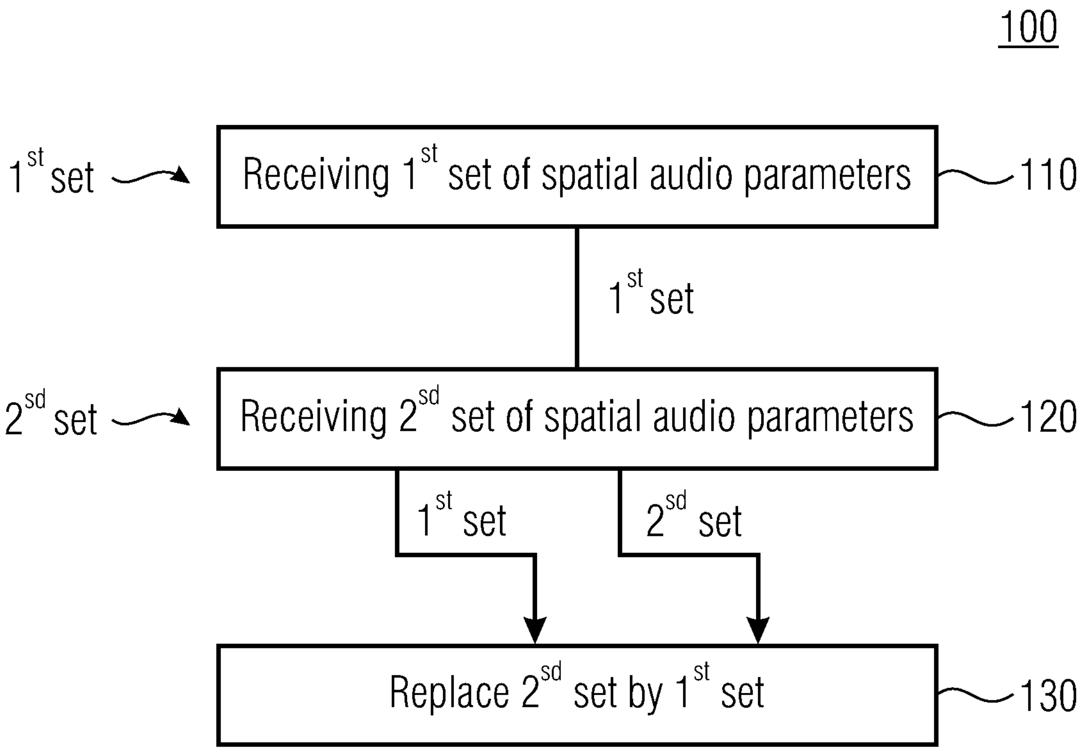
FIG. 3*a* shows a schematic flowchart of a method for loss concealment according to a basic embodiment.
Figure 3B:
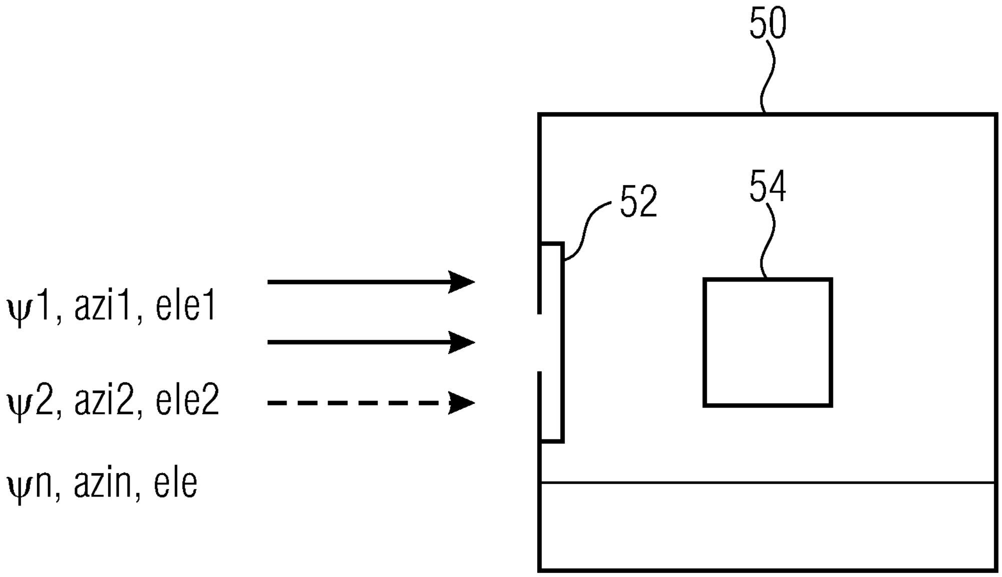
FIG. 3*b* shows a schematic loss concealment apparatus according to a basic embodiment.

FIGS. 3*a* and 3*b* illustrate embodiments of the present invention, wherein FIG. 3*a* shows the approach with focus on the basic concept/used method 100, wherein the used apparatus 50 is shown by FIG. 3*b*.

FIG. 3*a* illustrates the method 100 comprising the basic steps 110, 120 and 130.

The first steps 110 and 120 are comparable to each other, namely refer to the receiving of sets of spatial audio parameters. In the first step 110 the first set is received, wherein in the second step 120, the second set is received. Additionally, further receiving steps may be present (not shown). It should be noted that the first set may refer to the first point in time/first frame, the second set may refer to a second (subsequent) point in time/second (subsequent) frame, etc. As discussed above, the first set as well as the second set may comprise a diffuseness information (Ψ) and/or a direction information (azimuth and elevation). This information may be encoded by using a spatial metadata encoder. Now the assumption is made that the second set of information is lost or damaged during the transmission. In this case, the second set is replaced by a first set. This enables a packet loss concealment for spatial audio parameters like DirAC parameters.

In case of packet loss, the erased DirAC parameters of the lost frames need to be restituted for limiting the impact on quality. This can be achieved by synthetically generating the missing parameters by considering the past-received parameters. An unstable spatial image can be perceived as unpleasant and as an artifact, although a strictly constant spatial image may be perceived as unnatural.

The approach 100 as discussed with FIG. 3*a* can be performed by the entity 50 as shown by FIG. 3*b*. The apparatus for loss concealment 50 comprises an interface 52 and a processor 54. Via the interface, the sets of spatial audio parameters, Ψ1, azi1, ele1, Ψ2, azi2, ele2, ψn, azin, ele can be received. The processor 54 analyzes the received sets and, in case of a lost or damaged set, it replaces the lost or damaged set, e.g. by a previously received set or a comparable set. These different strategies may be used, which will be discussed below.

Hold strategy: It is generally safe to consider that the spatial image must be relatively stable over time, which can be translated for the DirAC parameters, i.e. the arrival direction and diffusion that they do not change much between frames. For this reason, a simple but effective approach is to keep the parameters of the last well-received frame for frames lost during transmission.

Extrapolation of the direction: Alternatively, it can be envisioned to estimate the trajectory of sound events in the audio scene and then try to extrapolate the estimated trajectory. It is especially relevant if the sound event is well localized in the space as a point source, which is reflected in the DirAC model by a low diffuseness. The estimated trajectory can be computed from observations of past directions and fitting a curve amongst these points, which can evolve either interpolation or smoothing. A regression analysis can be also employed. The extrapolation is then performed by evaluating the fitted curve beyond the range of observed data.

In DirAC, directions are often expressed, quantized and coded in polar coordinates. However, it is usually more convenient to process the directions and then the trajectory in Cartesian coordinates to avoid handling modulo 2 pi operations.

Dithering of the direction: When the sound event is more diffuse, the directions are less meaningful and can be considered as the realization of a stochastic process. Dithering can then help make more natural and more pleasant the rendered sound field by injecting a random noise to the previous directions before using it for the lost frames. The inject noise and its variance can be function of the diffuseness.

Using a standard DirAC audio scene analysis, we can study the influence of the diffuseness on the accuracy and meaningfulness of the direction of the model. Using an artificial B-format signal for which the Direct-to-Diffuse energy Ratio (DDR) is given between a plane wave component and diffuse field component, we can analyze the resulting DirAC parameters and their accuracy.

The theoretical diffuseness Ψ is function of the Direct-to-Diffuse energy Ratio (DDR), Γ, and is expressed as:

$$\Psi = \frac{P_{diff}}{P_{diff} + P_{pw}} = \frac{1}{1 + \frac{P_{pw}}{P_{diff}}} = \frac{1}{1 + 10^{\Gamma/10}},$$

where $P_{pw}$ and $P_{diff}$ are the plane wave and the diffuseness powers, respectively, and Γ is the DDR expressed in dB scale.

Of course, it is possible that one or a combination of the three discussed strategies may be used. The used strategy is selected by the processor 54 dependent on the received spatial audio parameter sets. For this, the audio parameters may, according to embodiments, be analyzed to enable the application of different strategies according to the characteristics of the audio scene and more particularly according to the diffuseness.

This means that, according to embodiments, the processor 54 is configured to provide packet loss concealment for spatial parametric audio by using previously well-received directional information and dithering. According to a further embodiment, the dithering is a function of the estimated diffuseness or energy ratio between directional and non-directional components of the audio scene. According to embodiments, the dithering is a function of the tonality measured of the transmitted downmix signal. Therefore, the analyzer performs its analysis based on estimated diffuseness, energy ratio and/or a tonality.

In FIGS. 3*a* and 3*b*, the measured diffuseness is given in function of DDR by simulating the diffuse field with N=466 uncorrelated pink noises evenly positioned on a sphere and the plane wave by an independent pink noise placed at 0 degree azimuth and 0 degree elevation. It confirmed that the diffuseness measured in DirAC analysis, is a good estimate of the theoretical diffuseness if the observation window length W is large enough. This implies that the diffuseness has long-term characteristics, which confirms that the parameter can in case of packet loss be well predicted by simply keeping the previously well-received value.

Figure 4A:
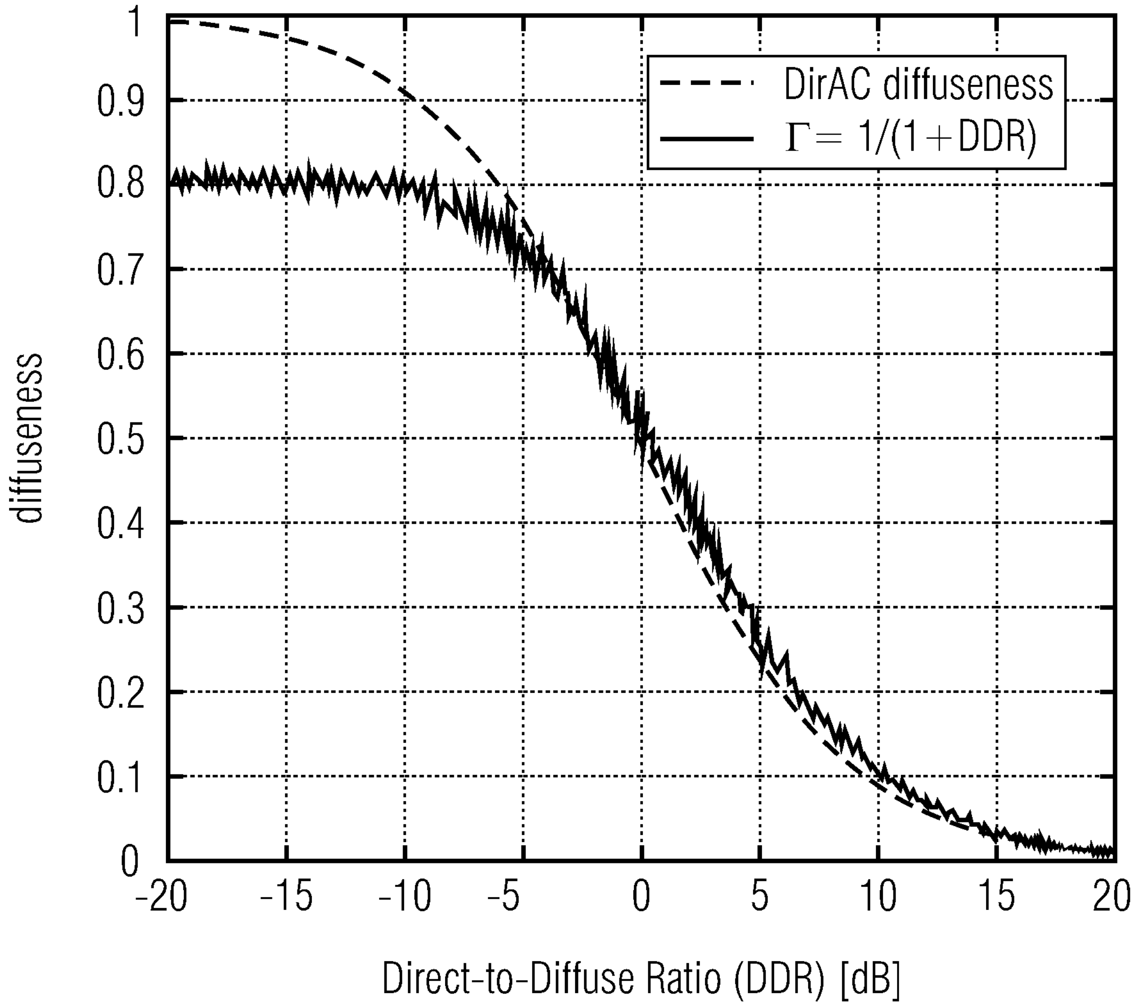
FIGS. 4*a*, 4*b* show schematic diagrams of measured diffuseness functions of DDR (FIG. 4*a* window size W=16, FIG. 4*b* window size W=512) in order to illustrate embodiments.
Figure 4B:
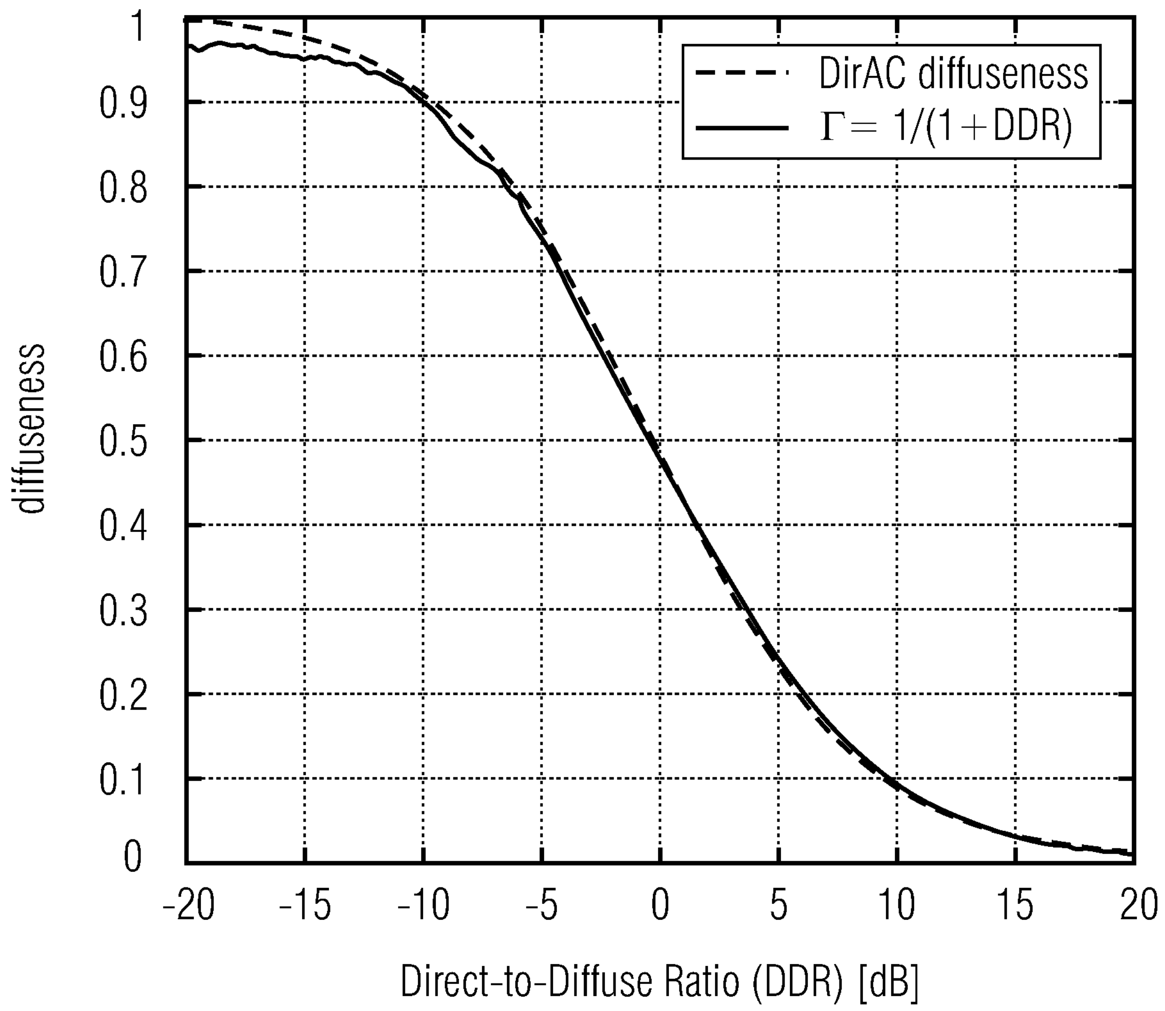
Figure 5:
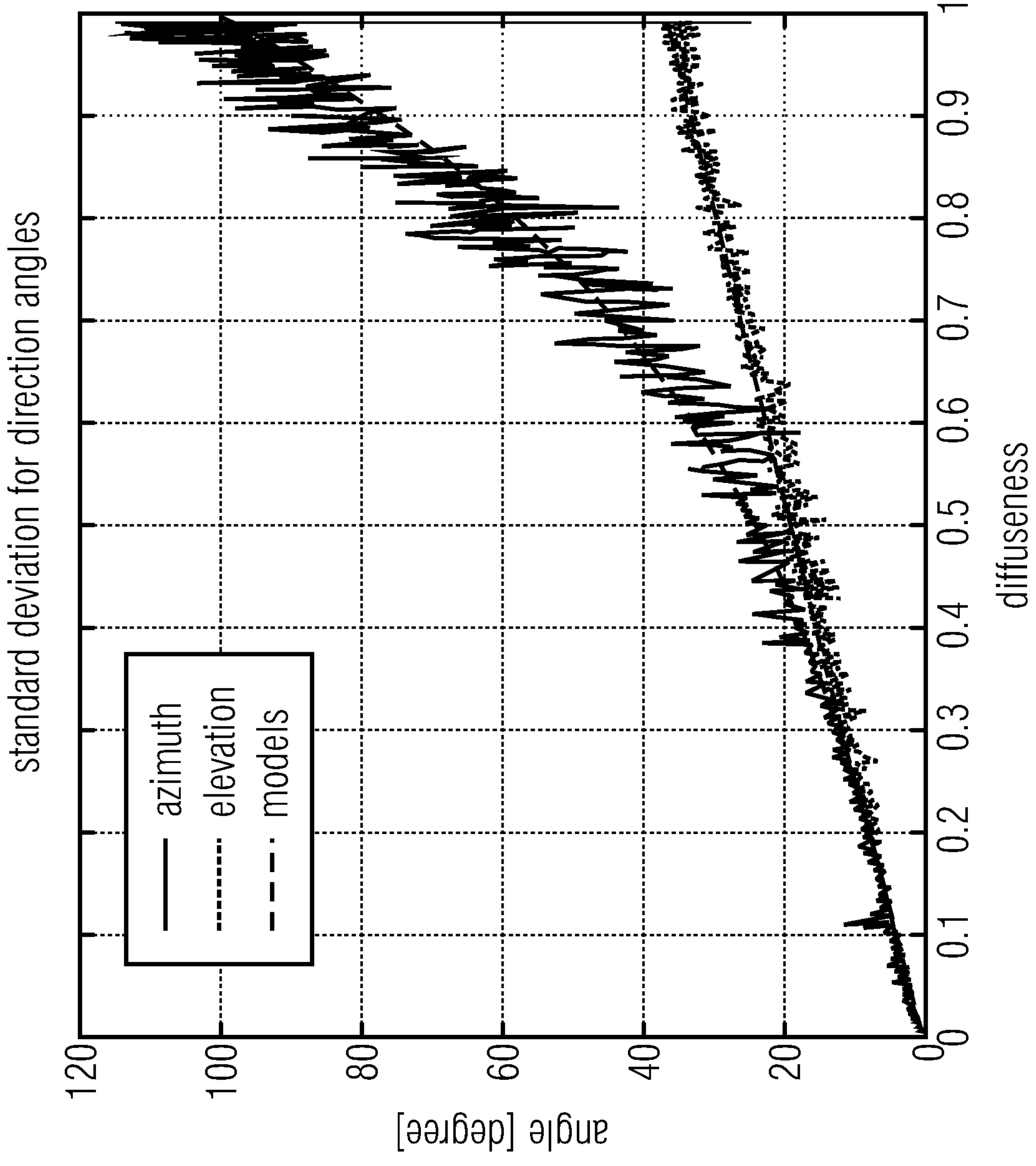
FIG. 5 shows a schematic diagram of measured direction (azimuth and elevation) in the function of diffuseness in order to illustrate embodiments.

On the other hand, the direction parameters estimation can also be assessed in function of true diffuseness, which is reported in FIG. 4. It can be shown that the estimated elevation and azimuth of the plane wave position deviate from the ground truth position (0 degree azimuth and 0 degree elevation) with a standard deviation increasing with the diffuseness. For a diffuseness of 1, the standard deviation is about 90 degrees for the azimuth angle defined between 0 and 360 degrees, corresponding to a completely random angle for a uniform distribution. In other words, the azimuth angle is then meaningless. The same observation can be made for the elevation. In general, the accuracy of estimated direction and its meaningfulness is decreasing with the diffuseness. It is then expected that the direction in DirAC will fluctuate over time and deviate from its expected value with a variance function of the diffuseness. This natural dispersion is part of the DirAC model, which is essential for a faithful reproduction of the audio scene. Indeed, rendering at a constant direction the directional component of DirAC even though the diffuseness is high, will generate either a point source that should in reality be perceived wider.

For the reasons exposed above, we propose to apply a dithering on the direction on top of the holding strategy. The amplitude of the dithering is made function of the diffuseness and can for example follow the models drawn in FIG. 4. Two models for the elevation and elevation measured angles can be derived for which the standard deviation is expressed as:

$$\sigma_{azi}=65\Psi^{3.5}+\sigma_{ele}$$

$$\sigma_{ele}=33.25\Psi+1.25$$

The pseudo-code of DirAC parameter concealment can be then:

```
for k in frame_start:frame_end
{
  if(bad_frame_indicator[k])
  {
    for band in band_start:band_end
    {
      diff_index = diffuseness_index[k-1][band];
      diffuseness[k][band] = unquantize_diffuseness(diff_index);
      azimuth_index[k][b] = azimuth_index[k-1][b];
      azimuth[k][b] = unquantize_azimuth(azimuth_index[k][b])
      azimuth[k][b] = azimuth[k][b] + random( ) * dithering_azi_scale[diff_index]
      elevation_index[k][b] = elevation_index[k-1][b];
      elevation[k][b] = unquantize_elevation(elevation_index[k][b])
      elevation[k][b] = elevation[k][b] + random( ) * dithering_ele_scale[diff_index]
  }
  else
  {
    for band in band_start:band_end
    {
      diffuseness_index[k][b] = read_diffusess_index( )
      azimuth_index[k][b] = read_azimuth _index( )
      elevation_index[k][b] = read_elevation_index( )
      diffuseness[k][b] = unquantize_diffuseness(diffuseness_index[k][b])
      azimuth[k][b] = unquantize_azimuth(azimuth_index[k][b])
      elevation[k][b] = unquantize_elevation(elevation_index[k][b])
  }
  output_frame[k]        =        Dirac_synthesis(diffuseness[k][b],        azimuth[k][b],
elevation[k][b])
}
```

where bad_frame_indicator[k] is a flag indicating whether the frame at index k was well received or not. In case of good frame, the DirAC parameters are read, decoded and unquantized for each parameter bands corresponding to a given frequency range. In case of bad frame, diffuseness is directly hold from the last well-received frame at the same parameter band, while the azimuth and elevation are derived from unquantizing the last well-received indices with injection of a random value scaled by a factor function of the diffuseness index. The function random( ) output a random value according to a given distribution. The random process can follow for example a standard normal distribution with zero mean and unit variance. Alternatively, it can follow a uniform distribution between −1 and 1 or follow a triangle probability density using for example the following pseudo code:

```
random( )
{
  rand_val = uniform _random( );
  if( rand_val <= 0.0f )
  {
    return 0.5f * sqrt(rand_val + 1.0f) − 0.5f;
  }
  else
  {
    return 0.5f − 0.5f * sqrt(1.0f − rand_val);
  }
}
```

The dithering scales are functions of the diffuseness index inherited from the last well-received frame at the same parameter band and can be derived from the models deduced form FIG. 4. For examplein case the diffuseness is coded on 8 indices, they can corresponds to the following tables:

```
dithering_azi_scale[8] = {
  6.716062e-01f,  1.011837e+00f,  1.799065e+00f,  2.824915e+00f,
4.800879e+00f, 9.206031e+00f,  1.469832e+01f,  2.566224e+01f
};
dithering_ele_scale[8] = {
  6.716062e-01f,  1.011804e+00f,  1.796875e+00f,  2.804382e+00f,
4.623130e+00f,  7.802667e+00f,  1.045446e+01f,  1.379538e+01f
};
```

Additionally, the dithering strength can be also steered depending of the nature of the down-mix signal. Indeed, very tonal signal tends to be perceived as more localized source as non-tonal signals. Therefore, the dithering can be then adjusted in function of the tonality of the transmitted down-mix, by means of decreasing the dithering effect for tonal items. The tonality can be measured for example in time domain by computing a long-term prediction gain or in frequency domain by measuring a spectral flatness.

With respect to FIGS. 6*a* and 6*b*, further embodiments referring to a method for decoding a DirAC encoded audio scene (cf. FIG. 6*a*, method 200) and a decoder 17 for a DirAC encoded audio scene (cf. FIG. 6*b*) will be discussed.

Figure 6A:
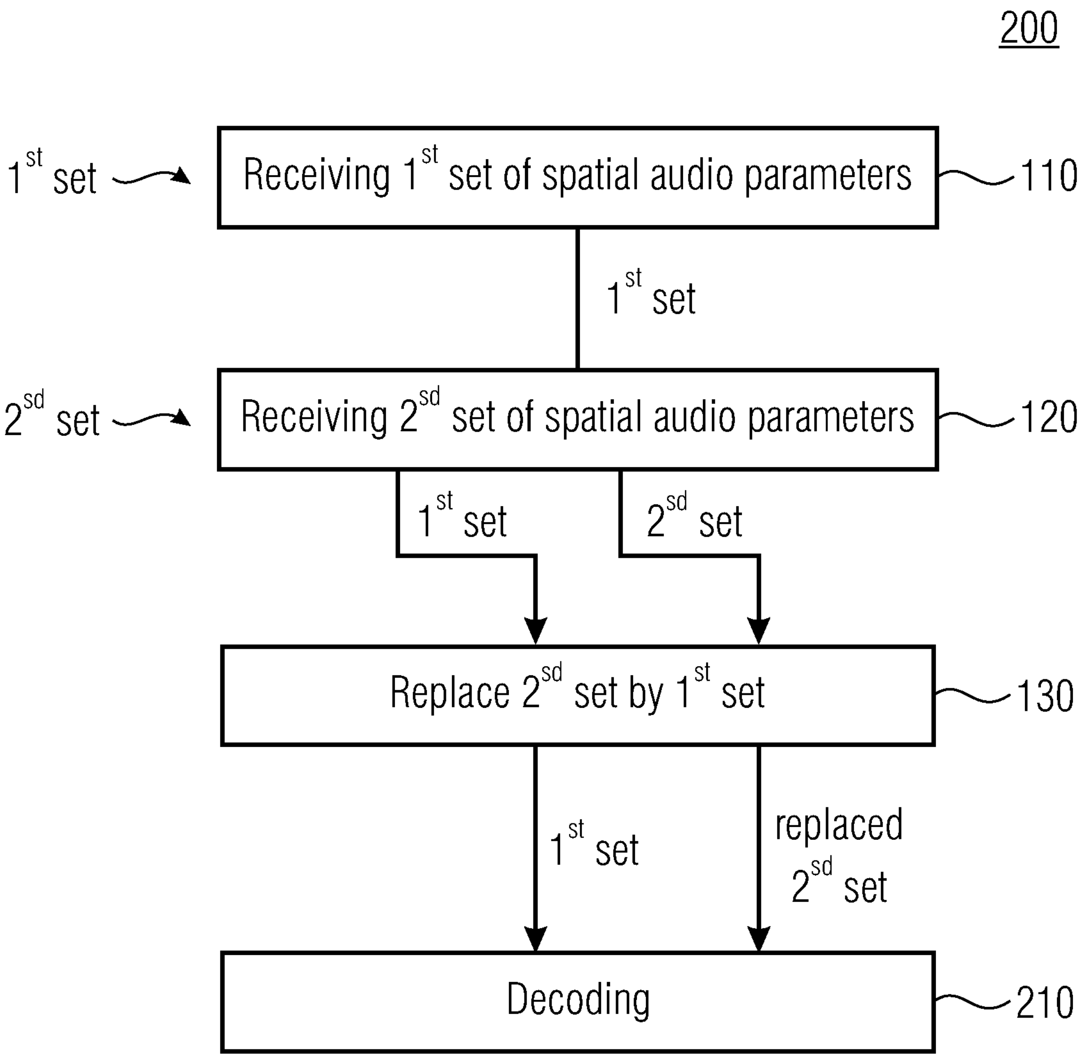
FIG. 6*a* shows a schematic flowchart of a method for decoding a DirAC encoded audio scene according to embodiments.
Figure 6B:
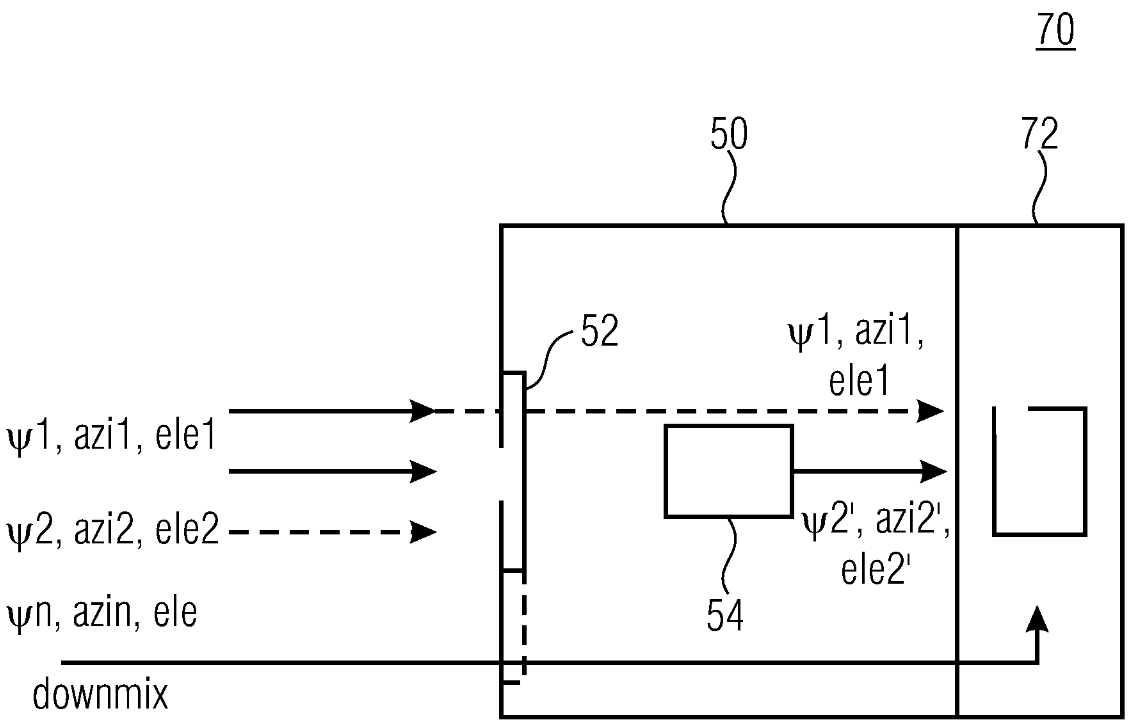
FIG. 6*b* shows a schematic block diagram of a decoder for a DirAC encoded audio scene according to an embodiment.

FIG. 6*a* illustrates the new method 200 comprising the steps 110, 120 and 130 of the method 100 and an additional step of decoding 210. The step of decoding enables the decoding of a DirAC encoded audio scene comprising a downmix (not shown) by use of the first set of spatial audio parameters and a second set of spatial audio parameters, wherein here, the replaced second set is used, output by the step 130. This concept is used by the apparatus 17, shown by FIG. 6*b*. FIG. 6*b* shows a decoder 70 comprising the processor for loss concealment of spatial audio parameters 15 and a DirAC decoder 72. The DirAC decoder 72 or, in more detail the processor of the DirAC decoder 72, receives a downmix signal and the sets of spatial audio parameters, e.g. directly from the interface 52 and/or processed by the processor 52 in accordance with the above-discussed approach.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] V. Pulkki, M-V. Laitinen, J. Vilkamo, J. Ahonen, T. Lokki, and T. Pihlajamäki, "Directional audio coding— perception-based reproduction of spatial sound", International Workshop on the Principles and Application on Spatial Hearing, November 2009, Zao; Miyagi, Japan.

[2] V. Pulkki, "Virtual source positioning using vector base amplitude panning", J. Audio Eng. Soc., 45(6): 456-466, June 1997.

[3] J. Ahonen and V. Pulkki, "Diffuseness estimation using temporal variation of intensity vectors", in Workshop on Applications of Signal Processing to Audio and Acoustics WASPAA, Mohonk Mountain House, New Paltz, 2009.

[4] T. Hirvonen, J. Ahonen, and V. Pulkki, "Perceptual compression methods for metadata in Directional Audio Coding applied to audiovisual teleconference", AES 126th Convention 2009, May 7-10, Munich, Germany.

[5] A. Politis, J. Vilkamo and V. Pulkki, "Sector-Based Parametric Sound Field Reproduction in the Spherical Harmonic Domain," in *IEEE Journal of Selected Topics in Signal Processing*, vol. 9, no. 5, pp. 852-866, Aug. 2015.

What is claimed is:

1. A method for loss concealment of spatial audio parameters, the spatial audio parameters comprising at least a direction of arrival information, the method comprising:
- receiving a first set of spatial audio parameters comprising at least a first direction of arrival information;
- receiving a second set of spatial audio parameters, comprising at least a second direction of arrival information; and
- replacing the second direction of arrival information of a second set by a replacement direction of arrival information derived from the first direction of arrival information, if at least the second direction of arrival information or a portion of the second direction of arrival information is lost or damaged,
- wherein replacing comprises dithering the replacement direction of arrival information; and/or wherein replacing comprises injecting random noise to the first direction of arrival information to acquire the replacement direction of arrival information;
- wherein injecting is performed, if a first or second diffuseness information indicates a high diffuseness; and/or if a first or second diffuseness information is above a predetermined threshold for the diffuseness information.

2. The method according to claim 1, wherein the first and second sets of spatial audio parameters comprise a first and a second diffuseness information, respectively.

3. The method according to claim 2, wherein the first or the second diffuseness information is derived from at least one energy ratio related to at least one direction of arrival information.

4. The method according to claim 2, wherein the method further comprises replacing the second diffuseness information of a second set by a replacement diffuseness information derived from the first diffuseness information.

5. The method according to claim 1, wherein the replacement direction of arrival information complies with the first direction of arrival information.

6. The method according to claim 1, wherein the diffuseness information comprises or is based on a ratio between directional and non-directional components of an audio scene described by the first and/or the second set of spatial audio parameters.

7. The method according to claim 1, wherein the random noise to be injected is dependent on the first and/or second diffuseness information; and/or
- wherein the random noise to be injected is scaled by a factor depending on the first and/or second diffuseness information.

8. The method according to claim 1, further comprising analyzing the tonality of an audio scene described by the first and/or second set of spatial audio parameters or of analyzing the tonality of a transmitted downmix belonging to the first and/or second set of spatial audio parameters to acquire a tonality value describing the tonality; and
- wherein the random noise to be injected is dependent on the tonality value.

9. The method according to claim 8, wherein the random noise is scaled down by a factor decreasing together with the inverse of the tonality value or if the tonality increases.

10. The method according to claim 1, wherein the method comprises extrapolating the first direction of arrival information to acquire the replacement direction of arrival information.

11. The method according to claim 10, wherein the extrapolating is based on one or more additional direction of arrival information belonging to one or more sets of spatial audio parameters.

12. The method according to claim 10, wherein the extrapolation is performed, if the first and/or second diffuseness information indicates a low diffuseness; or if the first and/or second diffuseness information are below a predetermined threshold for diffuseness information.

13. The method according to claim 1, wherein the first set of spatial audio parameters belong to a first point in time and/or to a first frame and wherein the second set of spatial audio parameters belong to a second point in time and/or to a second frame; or
- wherein the first set of spatial audio parameters belong to a first point in time and wherein the second point in time is subsequent to the first point in time or wherein the second frame is subsequent to the first frame.

14. The method according to claim 1, wherein the first set of spatial audio parameters comprise a first subset of spatial audio parameters for a first frequency band and a second subset of spatial audio parameters for a second frequency band; and/or
- wherein the second set of spatial audio parameters comprise another first subset of spatial audio parameters for the first frequency band and another second subset of spatial audio parameters for the second frequency band.

15. A method for decoding a DirAC encoded audio scene, comprising:
- decoding the DirAC encoded audio scene comprising a downmix, a first set of spatial audio parameters and a second set of spatial audio parameters;
- performing the method for loss concealment according to claim 1.

16. A non-transitory digital storage medium having stored thereon a computer program for performing a method for decoding a DirAC encoded audio scene, comprising:
- decoding the DirAC encoded audio scene comprising a downmix, a first set of spatial audio parameters and a second set of spatial audio parameters;
- performing the method for loss concealment according to claim 1,
- when said computer program is run by a computer.

17. A non-transitory digital storage medium having stored thereon a computer program for performing a method for loss concealment of spatial audio parameters, the spatial audio parameters comprising at least a direction of arrival information, comprising:

receiving a first set of spatial audio parameters comprising at least a first direction of arrival information;

receiving a second set of spatial audio parameters, comprising at least a second direction of arrival information; and replacing the second direction of arrival information of a second set by a replacement direction of arrival information derived from the first direction of arrival information, if at least the second direction of arrival information or a portion of the second direction of arrival information is lost or damaged, wherein replacing comprises dithering the replacement direction of arrival information; and/or wherein replacing comprises injecting random noise to the first direction of arrival information to acquire the replacement direction of arrival information;

wherein injecting is performed, if a first or second diffuseness information indicates a high diffuseness; and/or if a first or second diffuseness information is above a predetermined threshold for the diffuseness information, when said computer program is run by a computer.

18. A loss concealment apparatus for loss concealment of spatial audio parameters, the spatial audio parameters comprising at least a direction of arrival information, the apparatus comprising:

a receiver for receiving a first set of spatial audio parameters comprising a first direction of arrival information and for receiving a second set of spatial audio parameters comprising a second direction of arrival information;

a processor for replacing the second direction of arrival information of the second set by a replacement direction of arrival information derived from the first direction of arrival information if at least the second direction of arrival information or a portion of the second direction of arrival information is lost or damaged, wherein replacing comprises dithering the replacement direction of arrival information; and/or wherein replacing comprises injecting random noise to the first direction of arrival information to acquire the replacement direction of arrival information;

wherein injecting is performed, if a first or second diffuseness information indicates a high diffuseness; and/or if a first or second diffuseness information is above a predetermined threshold for the diffuseness information.

19. A decoder for a DirAC encoded audio scene comprising the loss concealment apparatus according to claim 18.

* * * * *